(12) United States Patent
D'Anna

(10) Patent No.: US 9,415,866 B2
(45) Date of Patent: Aug. 16, 2016

(54) LOW DRAG ROTOR SYSTEM

(71) Applicant: Sikorsky Aircraft Corporation, Stratford, CT (US)

(72) Inventor: Frank P. D'Anna, Seymour, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 225 days.

(21) Appl. No.: 13/856,062

(22) Filed: Apr. 3, 2013

(65) Prior Publication Data

US 2014/0299709 A1 Oct. 9, 2014

(51) Int. Cl.
| | | |
|---|---|---|
| *B64C 27/35* | (2006.01) | |
| *B64C 7/00* | (2006.01) | |
| *B64C 27/04* | (2006.01) | |
| *B64C 27/48* | (2006.01) | |

(52) U.S. Cl.
CPC . *B64C 27/35* (2013.01); *B64C 7/00* (2013.01); *B64C 27/04* (2013.01); *B64C 27/48* (2013.01)

(58) Field of Classification Search
CPC ...................................... B64C 27/35
USPC ..................................... 416/134 A
See application file for complete search history.

(56) References Cited

U.S. PATENT DOCUMENTS

| | | | |
|---|---|---|---|
| 3,056,456 A | | 10/1962 | Michel et al. |
| 3,106,965 A | * | 10/1963 | Gorndt et al. ............ 416/134 R |
| 3,217,811 A | | 11/1965 | Hibyan et al. |
| 3,652,185 A | * | 3/1972 | Cresap et al. ............ 416/134 R |
| 4,212,588 A | | 7/1980 | Fradenburgh |
| 4,323,332 A | | 4/1982 | Fradenburgh |
| 4,361,415 A | | 11/1982 | Aubry |
| 4,541,777 A | | 9/1985 | Sampatacos |
| 4,564,336 A | | 1/1986 | Sampatacos |
| 4,580,944 A | | 4/1986 | Miller |
| 5,267,833 A | * | 12/1993 | Mouille ........................ 416/107 |
| 7,229,251 B2 | | 6/2007 | Bertolotti et al. |
| 7,530,787 B2 | | 5/2009 | Bertolotti et al. |
| 2007/0166163 A1 | | 7/2007 | Bertolotti et al. |

FOREIGN PATENT DOCUMENTS

| | | |
|---|---|---|
| GB | 908498 | 9/1962 |
| GB | 1037542 | 7/1966 |
| GB | 1127887 | 9/1968 |
| GB | 2158797 A | 11/1985 |

* cited by examiner

*Primary Examiner* — Brian M O'Hara
(74) *Attorney, Agent, or Firm* — Cantor Colburn LLP

(57) ABSTRACT

A rotor assembly includes a rotor hub rotatable about a central axis including a plurality of rotor hub arms and blade yokes, each blade yoke including yoke arms located at opposing lateral sides of a corresponding one of the rotor hub arms to which the rotor hub arm is operably connected. The rotor assembly further includes blade retention bearings, each blade retention bearing being a single-element bearing disposed at a corresponding one of the rotor hub arms and which is supportive of a corresponding one of the blade yokes. Rotor blades are secured to corresponding ones of the blade yokes.

16 Claims, 6 Drawing Sheets

LOW DRAG ROTOR SYSTEM

BACKGROUND

The subject matter disclosed herein relates to the art of rotary wing aircraft and, more specifically, to rotor systems for rotary wing aircraft.

The rotor systems of rotary wing aircraft, for example, helicopters, are a major source of aerodynamic drag during operation of the helicopter. The rotor system typically includes a rotor hub with a number of rotor blades secured to and extending from the rotor hub. In many rotor systems, the rotor blades are connected to the rotor hub via an intermediate component or components, such as a yoke. The yoke is fixed to the rotor blade and rotatably secured to the rotor hub via a bearing set to allow for rotation of the rotor blade about a rotor blade axis, otherwise known as pitch change. Further, to enable and/or control pitch change of the rotor blades, pitch change arms connect to the yoke, such that movement of the pitch change arms adjust pitch of the rotor blades. Moreover, helicopter rotor systems often include large, bulky vibration absorbers at the rotor hub.

Rotor systems have previously included fairings in an attempt to reduce aerodynamic drag, but the fairings were unable to enclose the entire rotor system due to the design or requirements of one or more of the components described above. Often, one or more of the components is left protruding from the fairing or the resultant fairing-enclosed rotor system has much less than ideal impact on aerodynamics, because the attempt to make the rotor system more aerodynamic occurs after the rotor system has already been designed and configured, causing the fairing to be designed around existing features of the rotor system.

BRIEF DESCRIPTION

In one embodiment, a rotor assembly includes a rotor hub rotatable about a central axis including a plurality of rotor hub arms and blade yokes, each blade yoke including yoke arms located at opposing lateral sides of a corresponding one of the rotor hub arms to which the rotor hub arm is operably connected. The rotor assembly further includes blade retention bearings, each blade retention bearing being a single-element bearing disposed at a corresponding one of the rotor hub arms and which is supportive of a corresponding one of the blade yokes. Rotor blades are secured to corresponding ones of the blade yokes.

In another embodiment, a rotor assembly includes a rotor hub rotatable about a central axis including a plurality of rotor hub arms and blade yokes, each blade yoke including yoke arms located at opposing lateral sides of a corresponding one of the rotor hub arms to which the rotor hub arm is operably connected. The rotor assembly further includes blade pitch rods, each blade pitch rod being operably connected to a trailing edge side of one of the blade yokes, relative to a direction of rotor assembly rotation about the central axis. Rotor blades are secured to a corresponding one of the blade yokes.

In yet another embodiment, a helicopter includes an airframe, a drive system, and a rotor assembly operably connected to the drive system. The rotor assembly includes a rotor hub rotatable about a central axis including a plurality of rotor hub arms and blade yokes, each blade yoke including yoke arms located at opposing lateral sides of a corresponding one of the rotor hub arms to which the rotor hub arm is operably connected. The rotor assembly further includes blade retention bearings, each blade retention bearing being a single-element bearing disposed at a corresponding one of the rotor hub arms and which is supportive of a corresponding one of the blade yokes. Rotor blades are secured to corresponding ones of the blade yokes. An aerodynamic fairing is installed over the rotor hub and at least partially over the blade yokes.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
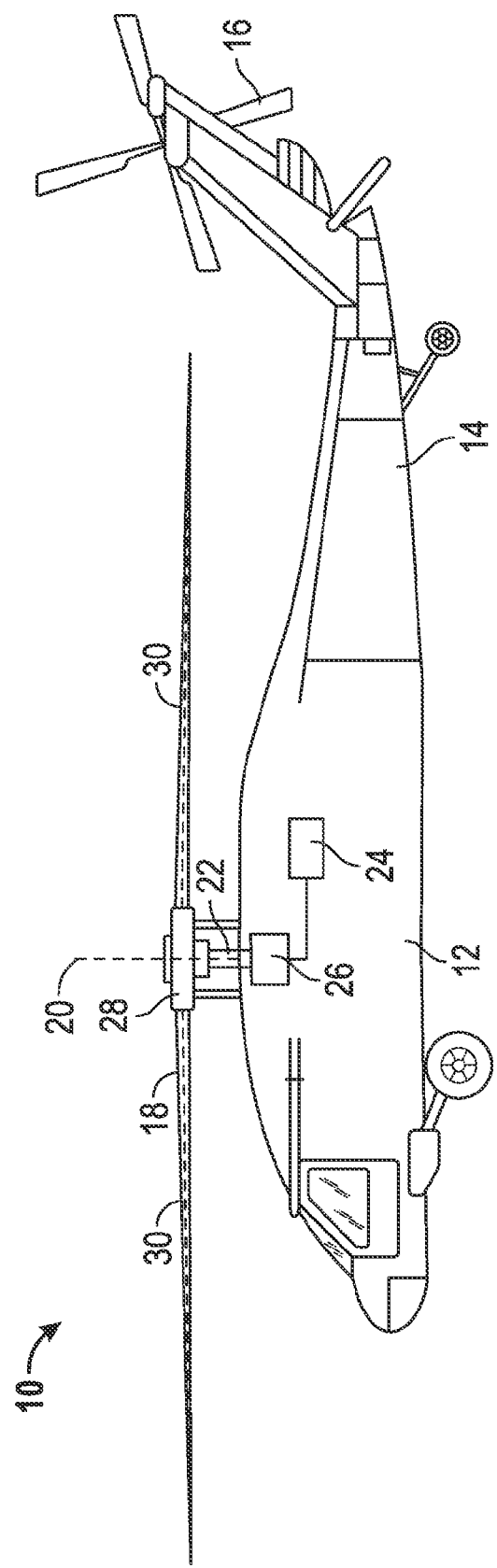
FIG. 1 is a schematic view of an embodiment of a helicopter.

Shown in FIG. 1 is schematic view of an embodiment of an aircraft, in this embodiment a helicopter 10. The helicopter 10 includes an airframe 12 with an extending tail 14 and a tail rotor 16 located thereat. While the embodiment of a helicopter 10 described herein includes an extending tail 14 and tail rotor 16, it is to be appreciated that the disclosure herein may be applied to other types of rotor craft as well as helicopters 10 of other configurations. A main rotor assembly 18 is located at the airframe 12 and rotates about a main rotor axis 20. The main rotor assembly 18 is driven by a drive shaft 22 connected to a power source, for example, an engine 24 by a gearbox 26.

The main rotor assembly 18 includes a rotor hub 28 located at the main rotor axis 20 and operably connected to the drive shaft 22. A plurality of blade assemblies 30 are connected to the rotor hub 28. As will be described in greater detail below, the main rotor assembly 18 includes a number of features to reduce aerodynamic drag of the main rotor assembly 18, and to more easily accommodate an aerodynamic fairing (not shown) installed to the main rotor assembly 18. While shown is a single axis rotor system, aspects of the invention can be used in multi-axis systems, such as the X2® helicopter produced by Sikorsky Aircraft Corporation.

Figure 2:
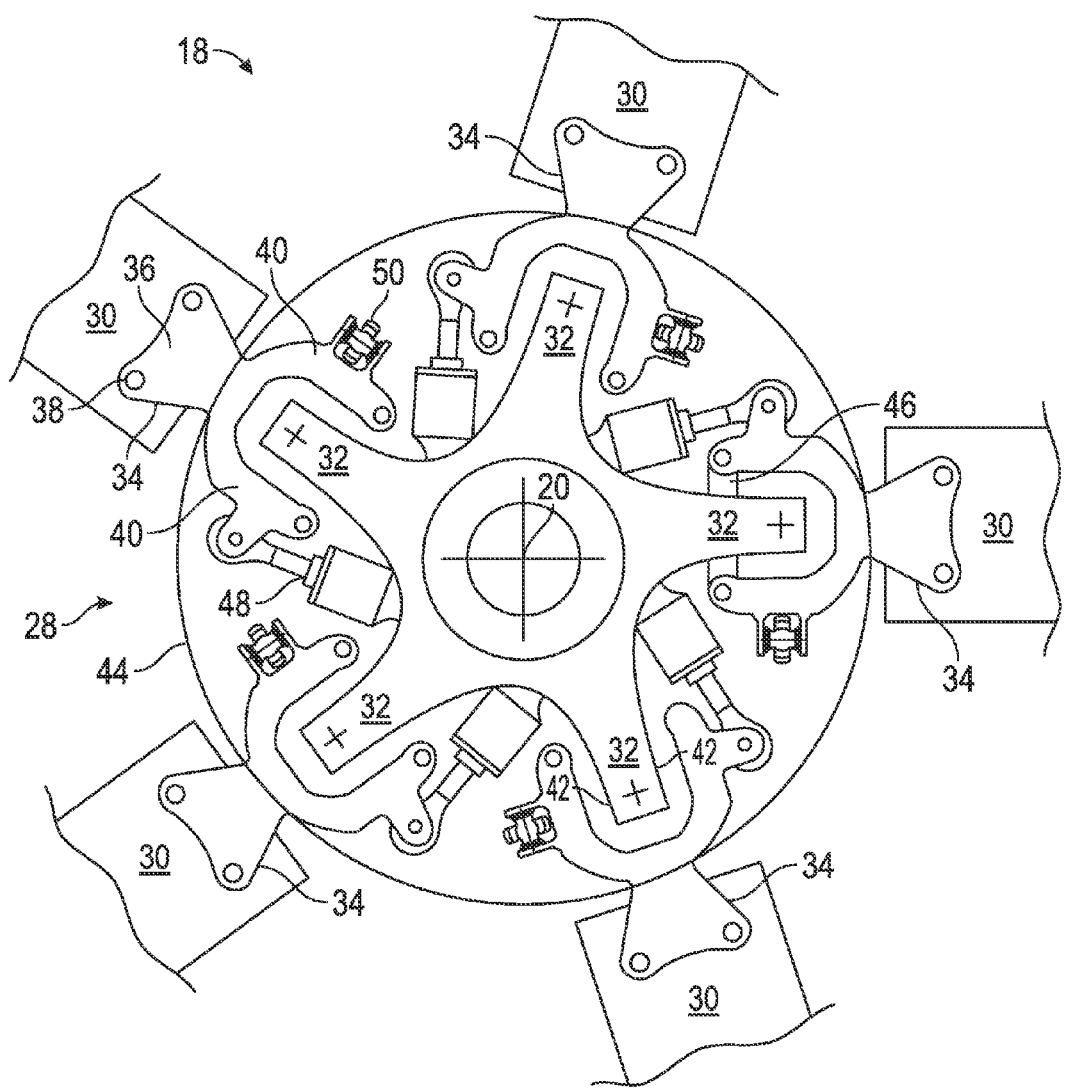
FIG. 2 is a plan view of an embodiment of a main rotor assembly.

Shown in FIG. 2 is a plan view of an embodiment of a main rotor assembly 18. The rotor hub 28 includes a plurality of hub arms 32 extending substantially radially outwardly. A blade assembly 30 is secured at each hub arm via a blade yoke 34. The blade yoke 34 includes a yoke base 36 to which the blade assembly 30 is secured via, for example, a plurality of screws or bolts 38. The blade yoke 34 has two yoke arms 40 extending from the yoke base 36, with the yoke arms 40 are located at opposing lateral sides 42 of the hub arm 32. With the yoke arms 40 located at opposing lateral sides 42 of the hub arm 32, the yoke arms 40 are arranged substantially horizontally. Thus, the main rotor assembly 18 is referred to as having a "horizontal yoke", as opposed to a convention "vertical yoke" main rotor assembly where yoke arms are arranged substantially vertically. The horizontal yoke arrangement allows for more compact arrangement of components, such as blade damper 48 and blade pitch rod 50, thus reducing an effective diameter 44 of the rotor hub 28, which reduces aerodynamic drag, once a fairing (not shown) having the effective diameter 44 is attached.

Figure 3:
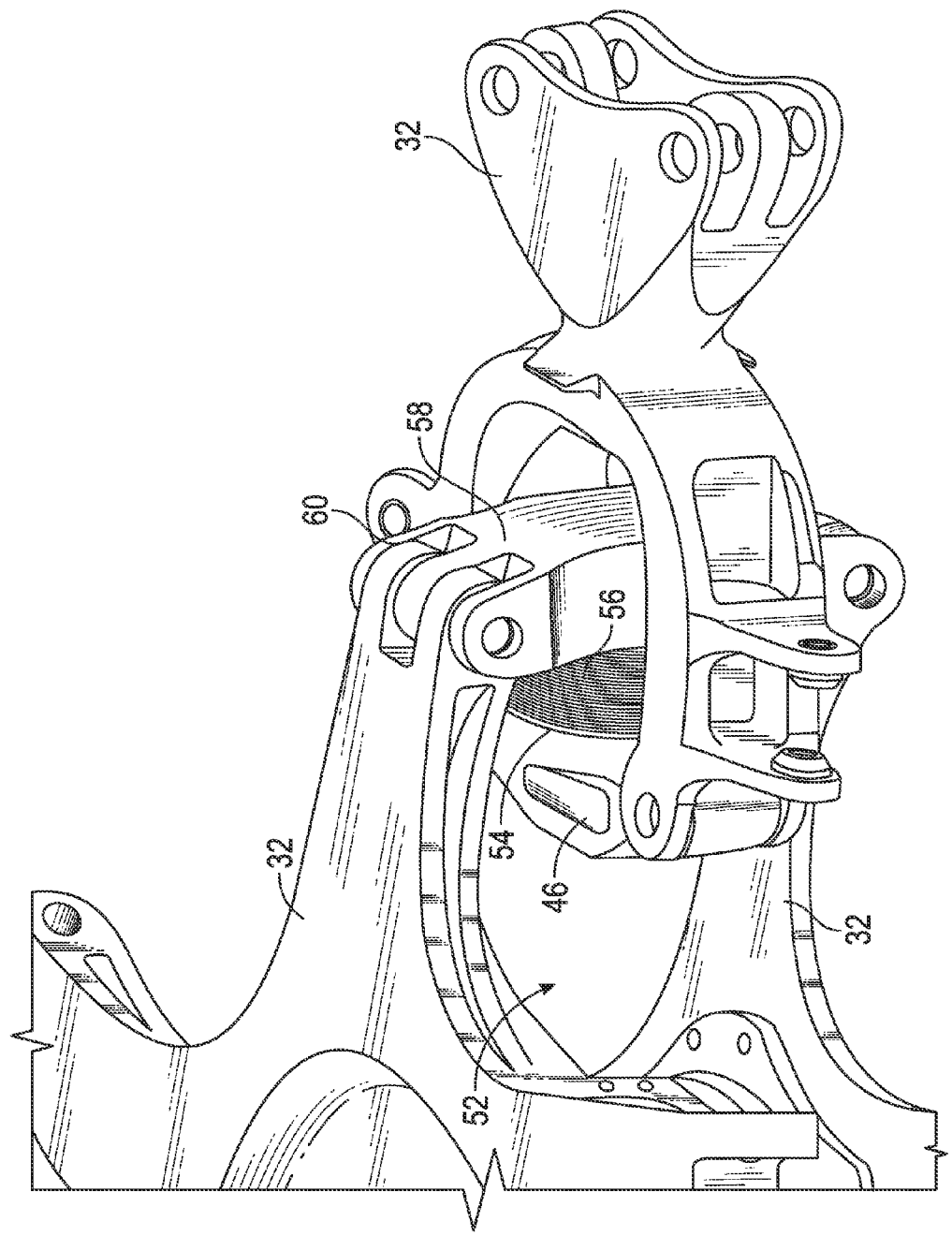
FIG. 3 is a cross-sectional view of a hub arm of a main rotor assembly.

Referring to FIG. 3, the blade yoke 34 is connected to the hub arm 32 via a spherical elastomeric bearing 54, which has an outer race 46 extending between the yoke arms 40 and through, for example, an arm opening 52 in the hub arm 32. The outer race 46 of the elastomeric bearing 56 is bonded to an outermost layer of an elastomer package 56, which is made up of many layers. An inner race 58 of the bearing 54 is attached to the hub arms 32, positioning the outer race 46 in the arm opening 52. In the embodiment of FIG. 3, the elastomeric package 56 is located such that the entirety of the bearing 54 is radially inboard of an outer diameter 60 of the blade arms 32, thus further reducing the effective diameter 44 of the rotor hub 28 compared to a convention main rotor with back-to-back bearing elements.

Figure 4:
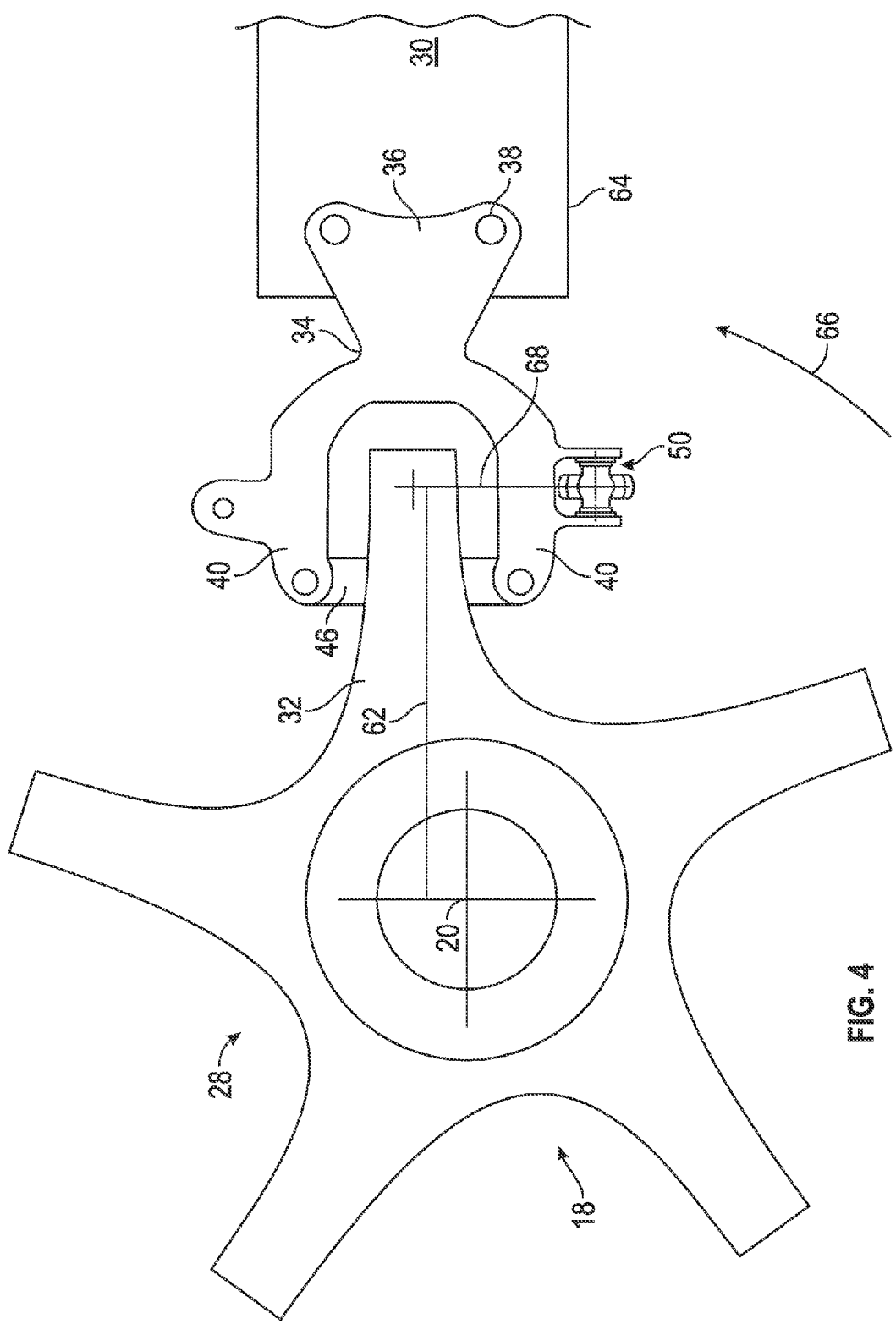
FIG. 4 is a plan view of another embodiment of a main rotor assembly.
Figure 5:
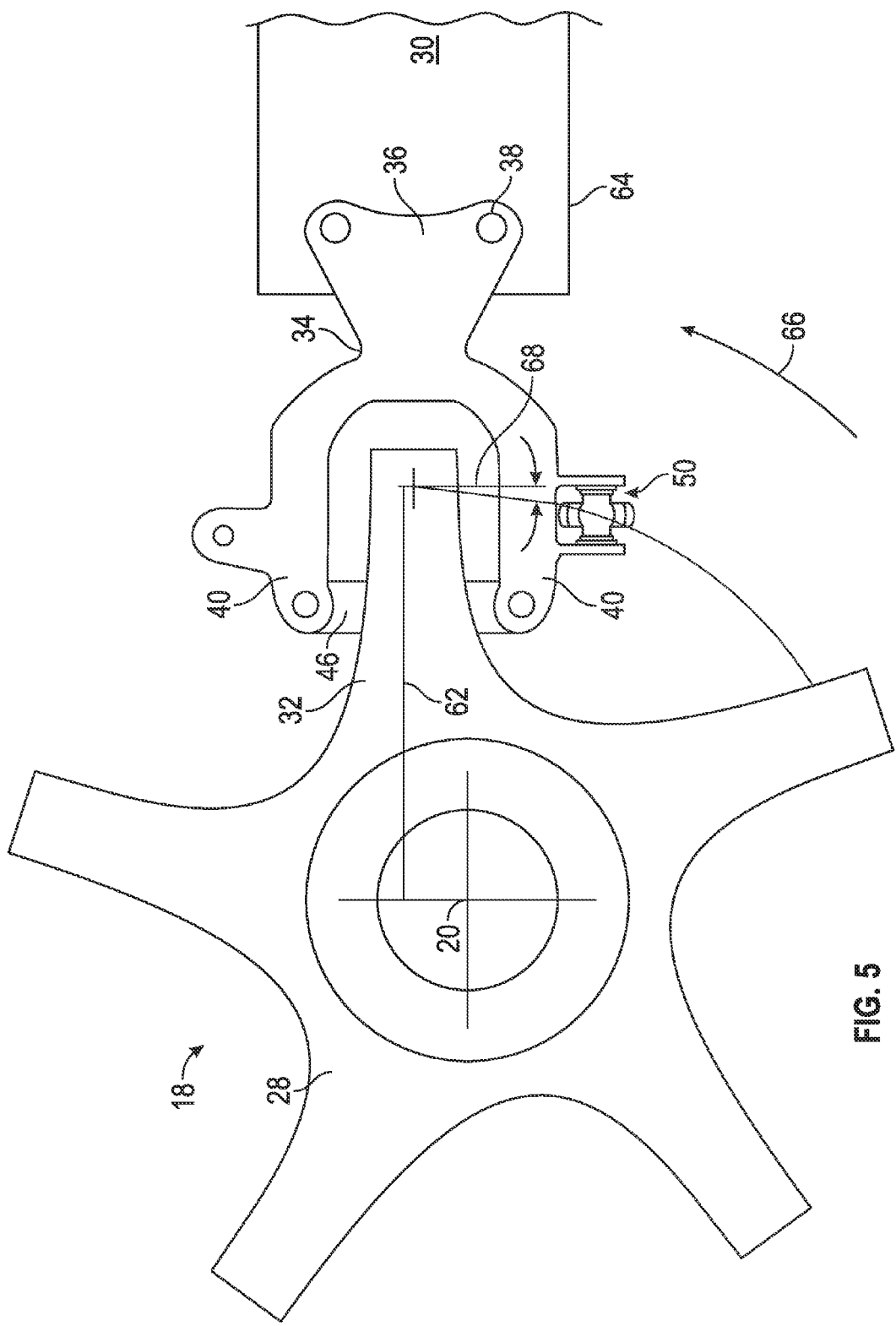
FIG. 5 is a plan view of yet another embodiment of a main rotor assembly.

Referring now to FIG. 4, a blade pitch rod 50 is connected to each blade yoke 34. The blade pitch rod 50 receives inputs to urge rotation of the blade yoke 34 (and thus the blade assembly 30) about a blade axis 62, thus changing a pitch of the blade assembly 30. The blade pitch rod 50 is connected to the blade yoke 34 at a yoke arm 40 closest to a trailing edge 64 of the blade assembly 30, relative to a direction of rotation 66 of the main rotor assembly 18 about the rotor axis 20. In some embodiments, as shown in FIG. 4, the blade pitch rod 50 may be located at substantially the same radial position as a flapping axis 68. The flapping axis 68 is an axis about which the blade assembly 30 moves up and down relative to the flight path of the helicopter 10. In other embodiments, as shown in FIG. 5, the blade pitch rod 50 is connected to the yoke arm 40 at a radial position inboard of the flapping axis 68. For example, the pitch rod 50 and the flapping axis 68 may be offset by an angle of about 3 degrees. Locating the blade pitch rod 50 inboard of the flapping axis 68 further reduces the effective diameter 44 of the main rotor assembly 18.

Figure 6:
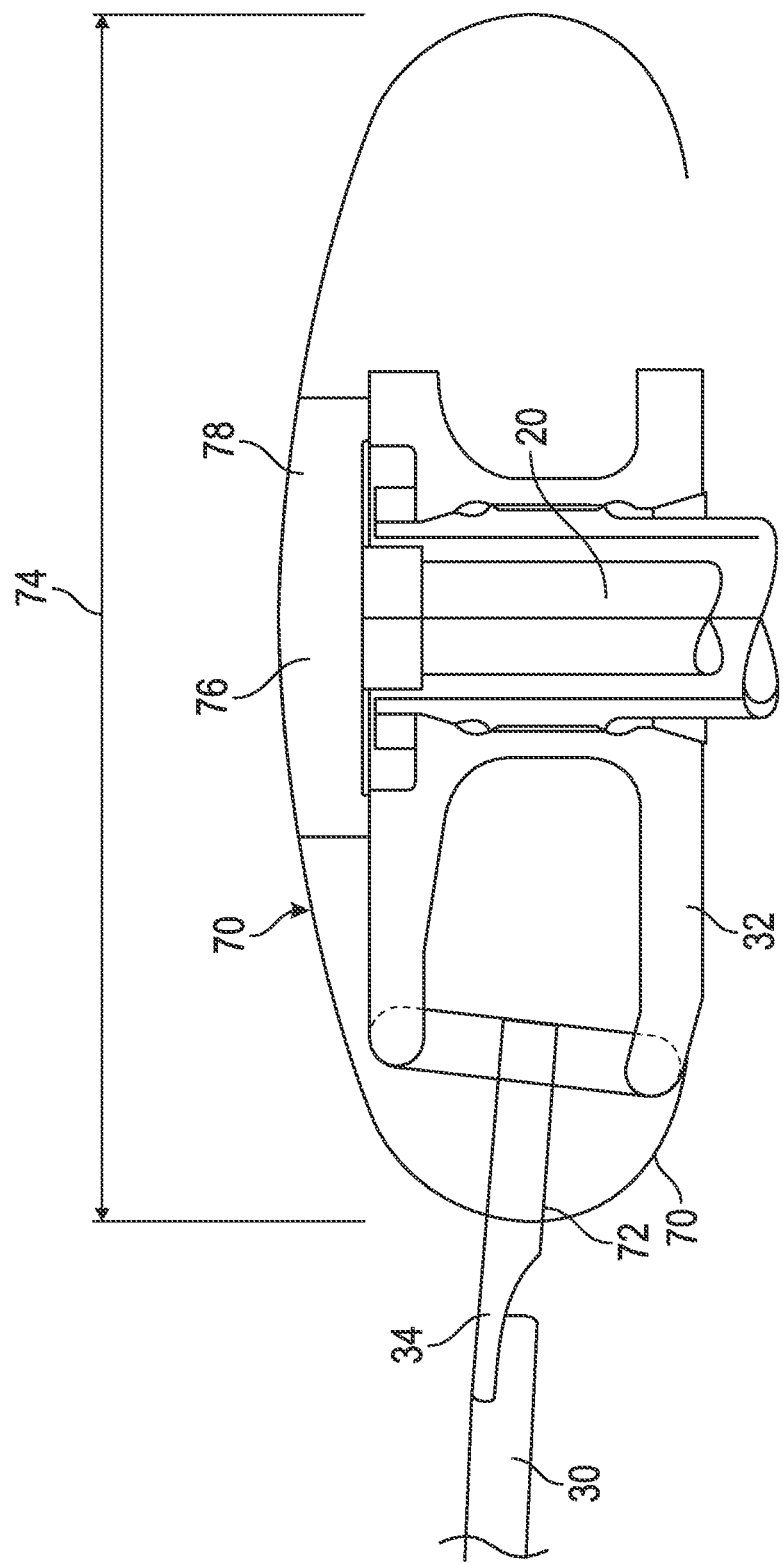
FIG. 6 is a cross-sectional view of another embodiment of a rotor assembly.

Referring to FIG. 6, an aerodynamic fairing 70 is installed over the rotor hub 28 and blade yokes 34, with the blade yokes 34 extending through fairing openings 72. While not required in all aspects, the fairing 70 can be a fiberglass and/or graphite fairing, although any material which maintains a shape can be used. Due to a combination of the horizontal yoke configuration, single element blade retention bearing 54, and the trailing edge 64 location of the blade pitch rod 50, a fairing diameter 74 can be greatly reduced when compared to a traditional fairing. Further, the configuration allows for the components such as blade dampers 48 to be enveloped by the fairing 70, not protrude through the fairing 70, which would reduce the effectiveness of the fairing 70 in reducing aerodynamic drag. Is some embodiments, the main rotor assembly 18 includes a vibration absorber 76 located, for example, vertically above the rotor hub 28. An upper surface 78 of the vibration absorber 76 forms a portion of the fairing 70, thus further reducing an aerodynamic profile of the main rotor assembly 18. However, the vibration absorber 76 need not form a portion of the fairing 70 in all aspects, such as when no absorber 76 is used or where the fairing 70 also covers the absorber 76.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For instance, aspects can be used with propeller assemblies and/or fans where blade pitch control and compactness of design may be useful. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed:

1. A rotor assembly comprising:
   a rotor hub rotatable about a central axis including a plurality of rotor hub arms integrally formed with and extending radially outwardly from the rotor hub, the plurality of rotor hub arms including:
      a plurality of rotor hub upper arms; and
      a plurality of rotor hub lower arms, the rotor hub lower arms offset from the rotor hub upper arms along the central axis and defining an arm opening therebetween;
   blade yokes, each blade yoke comprising:
      yoke arms located at opposing lateral sides of a corresponding one of the rotor hub arms to which the rotor hub arm is operably connected, each of the yoke arms includes a cantilevered end; and
      a bearing outer race secured to the cantilevered end of corresponding one of the yoke arms through a mechanical fastener and extending through the arm opening, the blade yoke in a noncontact arrangement with the rotor hub, wherein the mechanical fastener extends along an axis substantially parallel to the central axis;
   blade retention bearings, each blade retention bearing being a single-element bearing disposed at a corresponding one of the rotor hub arms and which is supportive of a corresponding one of the blade yokes and including:
      a bearing inner race extending between and secured to one of the rotor hub upper arms and the corresponding rotor hub lower arm radially outboard of the bearing outer race; and
      a bearing element disposed between the bearing outer race and the bearing inner race;
   rotor blades, each rotor blade being secured to a corresponding one of the blade yokes;
   wherein an entirety of each blade retention bearing is located radially inboard of an outer diameter of their respective rotor hub arms.

2. The rotor assembly of claim 1, wherein each single bearing element is disposed at a radially outboard side of the corresponding bearing outer race.

3. The rotor assembly of claim 1, wherein each blade retention bearing is a spherical bearing.

4. The rotor assembly of claim 1, further comprising blade pitch rods, each blade pitch rod being operably connected to a trailing edge side of a corresponding on of the blade yokes, relative to a direction of rotor assembly rotation about the central axis.

5. The rotor assembly of claim 4, wherein each blade pitch rod is radially offset inboard from a flapping axis of the rotor assembly.

6. The rotor assembly of claim 1, further comprising an aerodynamic fairing installed over the rotor hub and at least partially over the plurality of blade yokes.

7. A rotor assembly comprising:
a rotor hub rotatable about a central axis including a plurality of rotor hub arms integrally formed with and extending radially outwardly from the rotor hub, the rotor hub arms defining a plurality of arm openings;
blade yokes, each blade yoke comprising:
yoke arms located at opposing lateral sides of a corresponding one of the rotor hub arms to which the rotor hub arm is operably connected, each of the yoke arms including a cantilevered end; and
a bearing outer race secured to the cantilevered end of the corresponding one of the yoke arms through a mechanical fastener and extending through the arm opening, the blade yoke in a noncontact arrangement with the rotor hub, wherein the mechanical fastener extends along an axis substantially parallel to the central axis;
blade pitch rods, each blade pitch rod being operably connected to a trailing edge side of one of the blade yokes, relative to a direction of rotor assembly rotation about the central axis;
rotor blades, each rotor blade being secured to a corresponding one of the blade yokes; and
blade retention bearings, each blade retention bearing being a single-element bearing disposed at a corresponding one of the rotor hub arms and which is supportive of a corresponding one of the blade yokes, and including:
a bearing inner race secured to one of the rotor hub arms radially outboard of the bearing outer race; and
a bearing element disposed between the bearing outer race and the bearing inner race;
wherein an entirety of each blade retention bearing is located radially inboard of an outer diameter of their respective rotor hub arms.

8. The rotor assembly of claim 7, wherein each blade pitch rod is radially offset inboard from a flapping axis of the rotor assembly.

9. The rotor assembly of claim 7, wherein each single bearing element is disposed at a radially outboard side of the bearing outer race.

10. The rotor assembly of claim 7, wherein each blade retention bearing is a spherical bearing.

11. The rotor assembly of claim 7, further comprising an aerodynamic fairing installed over the rotor hub and at least partially over the plurality of blade yokes.

12. A helicopter comprising:
an airframe;
a drive system; and
a rotor assembly operably connected to the drive system including:
a rotor hub rotatable about a central axis including a plurality of rotor hub arms integrally formed with and extending radially outwardly from the rotor hub, the plurality of rotor hub arms including:
a plurality of rotor hub upper arms; and
a plurality of rotor hub lower arms, the rotor hub lower arms offset from the rotor hub upper arms along the central axis and defining an arm opening therebetween;
blade yokes, each blade yoke comprising:
yoke arms located at opposing lateral sides of a corresponding one of the rotor hub arms to which the rotor hub arm is operably connected, each of the yoke arms including a cantilevered end; and
a bearing outer race secured to the cantilevered end of the corresponding one of the yoke arms and extending through the arm opening, the blade yoke in a noncontact arrangement with the rotor hub;
blade retention bearings, each blade retention bearing being a single-element bearing disposed at a corresponding one of the rotor hub arms and which is supportive of a corresponding one of the blade yokes, and including:
a bearing inner race extending between and secured to one of the rotor hub upper arms and the corresponding rotor hub lower arm radially outboard of the bearing outer race; and
a bearing element disposed between the bearing outer race and the bearing inner race;
rotor blades, each rotor blade being secured to a corresponding one of the blade yokes; and
an aerodynamic fairing installed over the rotor hub and at least partially over the blade yokes;
a vibration absorber located above the rotor hub and forming a portion of the aerodynamic fairing;
wherein an entirety of each blade retention bearing is located radially inboard of an outer diameter of their respective rotor hub arms.

13. The helicopter of claim 12, wherein each single bearing element is disposed at a radially inboard side of the bearing outer race.

14. The helicopter of claim 12, wherein each blade retention bearing is a spherical bearing.

15. The helicopter of claim 12, further comprising blade pitch rods, each blade pitch rod being operably connected to a trailing edge side of a corresponding on of the blade yokes, relative to a direction of rotor assembly rotation about the central axis.

16. The helicopter of claim 15, wherein each blade pitch rod is radially offset inboard from a flapping axis of the rotor assembly.

* * * * *